United States Patent
Sakamoto et al.

(10) Patent No.: US 7,648,191 B2
(45) Date of Patent: Jan. 19, 2010

(54) AUTOMOBILE STRENGTH MEMBER

(75) Inventors: Shinya Sakamoto, Kimitsu (JP); Yoshio Terada, Kimitsu (JP); Motofumi Koyuba, Tokyo (JP); Fumihiko Niiyama, Kimitsu (JP); Eizaburo Nakanishi, Yokohama (JP); Masamoto Ono, Zama (JP)

(73) Assignee: Nippon Steel Corporation, Tokyo (JP)

( * ) Notice: Subject to any disclaimer, the term of this patent is extended or adjusted under 35 U.S.C. 154(b) by 537 days.

(21) Appl. No.: 10/956,918

(22) Filed: Sep. 30, 2004

(65) Prior Publication Data
US 2005/0073170 A1    Apr. 7, 2005

(30) Foreign Application Priority Data
Oct. 3, 2003    (JP)    ............................. 2003-345626

(51) Int. Cl.
*B60J 5/04*    (2006.01)
*B60R 19/42*    (2006.01)

(52) U.S. Cl. ............... 296/187.01; 29/897.2; 296/146.6

(58) Field of Classification Search .............. 296/146.6, 296/187.01, 187.03, 187.12; 29/897.2; 52/653.2, 52/731.6, 735.1
See application file for complete search history.

(56) References Cited

U.S. PATENT DOCUMENTS

| | | | | |
|---|---|---|---|---|
| 3,209,432 A | * | 10/1965 | Cape ......................... | 29/897.2 |
| 4,599,843 A | * | 7/1986 | Ingvarsson ................. | 52/735.1 |
| 4,826,238 A | * | 5/1989 | Misono et al. .............. | 296/209 |
| 5,232,261 A | | 8/1993 | Kuroda et al. | |
| 5,813,719 A | * | 9/1998 | Kowalski ................... | 296/146.6 |
| 5,857,734 A | * | 1/1999 | Okamura et al. ........ | 296/187.12 |
| 5,868,456 A | | 2/1999 | Kowalski et al. | |
| 6,020,039 A | * | 2/2000 | Cline et al. ................. | 428/36.9 |
| 6,138,429 A | * | 10/2000 | Baumgaertner ............ | 52/735.1 |

(Continued)

FOREIGN PATENT DOCUMENTS

EP    0 195 473 A1    9/1986

(Continued)

*Primary Examiner*—Glenn Dayoan
*Assistant Examiner*—Paul A Chenevert
(74) *Attorney, Agent, or Firm*—Kenyon & Kenyon LLP

(57) ABSTRACT

An automobile strength member, having a cross-sectional shape giving a high bending repulsion at the beginning of impact and able to reduce the production cost and lighten the weight and achieve a greater improvement in safety and a reduction of cost of an automobile, that is, an automobile strength member comprised of a rectangular steel tube with a square cross-section, simultaneously satisfying the following relations (1) to (3), and having a strength of at least 690 MPa in terms of tensile strength:

$$R_1 \leq 1.5t \tag{1}$$

$$t_R \geq 1.1t \tag{2}$$

$$R_1 \geq R_2 \tag{3}$$

where, t: thickness of side (mm)
$t_R$: thickness of corner (mm)
$R_1$: outside corner R (mm)
$R_2$: inside corner R (mm)
where both a maximum value and minimum value of hardness at a cross-section of the rectangular steel tube are in the range of within ±30% of the average value of the entire cross-section.

9 Claims, 2 Drawing Sheets

$t_R$: THICKNESS OF CORNER (mm)
$R_1$: OUTSIDE CORNER R (mm)
$R_2$: INSIDE CORNER R (mm)
$t_1$: THICKNESS OF ONE PAIR OF FACING SIDES (mm)
$t_2$: THICKNESS OF OTHER PAIR OF FACING SIDES (mm)

U.S. PATENT DOCUMENTS

| | | | | |
|---|---|---|---|---|
| 6,219,919 B1 * | 4/2001 | Gogo et al. | | 29/897.2 |
| 6,408,591 B1 * | 6/2002 | Yamashita et al. | | 52/731.6 |
| 6,513,242 B1 * | 2/2003 | Christofaro et al. | | 29/897.2 |
| 6,722,037 B2 * | 4/2004 | Nees et al. | | 29/897.2 |
| 6,752,451 B2 * | 6/2004 | Sakamoto et al. | | 296/187.03 |
| 6,896,317 B2 * | 5/2005 | Liebhard et al. | | 296/187.03 |
| 6,908,141 B2 * | 6/2005 | Doi et al. | | 296/146.6 |
| 6,976,728 B2 * | 12/2005 | Froeschle et al. | | 296/146.6 |
| 7,188,876 B2 * | 3/2007 | Jaarda et al. | | 293/133 |
| 2003/0132643 A1 * | 7/2003 | Sakuma et al. | | 296/146.6 |
| 2005/0073170 A1 * | 4/2005 | Sakamoto et al. | | 296/146.6 |
| 2005/0279049 A1 * | 12/2005 | MacKenzie et al. | | 52/730.4 |
| 2006/0208535 A1 * | 9/2006 | Peters et al. | | 296/187.12 |
| 2007/0001483 A1 * | 1/2007 | Uchida et al. | | 296/187.12 |
| 2007/0145772 A1 * | 6/2007 | Rieder et al. | | 296/146.6 |
| 2008/0143145 A1 * | 6/2008 | Gabler et al. | | 296/187.03 |

FOREIGN PATENT DOCUMENTS

| | | | | |
|---|---|---|---|---|
| JP | 04063720 A * | 2/1992 | | 296/146.4 |
| JP | H4-63242 | 2/1992 | | |
| JP | 6-534 | 1/1994 | | |
| JP | 06106978 A * | 4/1994 | | 296/146.6 |
| JP | 06227253 A * | 8/1994 | | 296/146.6 |
| JP | H6-278458 | 10/1994 | | |
| JP | 2002-248941 | 9/2002 | | |
| WO | WO 03/018338 A1 | 3/2003 | | |

* cited by examiner $t_R$: THICKNESS OF CORNER (mm)
$R_1$: OUTSIDE CORNER R (mm)
$R_2$: INSIDE CORNER R (mm)
$t_1$: THICKNESS OF ONE PAIR OF FACING SIDES (mm)
$t_2$: THICKNESS OF OTHER PAIR OF FACING SIDES (mm)

AUTOMOBILE STRENGTH MEMBER

BACKGROUND OF THE INVENTION

1. Field of the Invention

The present invention relates to an automobile strength member high in bending repulsion at the beginning of impact and able to reduce production costs and lighten the weight.

2. Description of the Related Art

In recent years, standards for side impact of automobiles have become tougher. The structural design concepts of chasses have changed as well. Automobile doors are being provided with door guard bars. In the past, door guard bars have been considered members deforming at the time of side impact so as to absorb the impact energy and reduce the impact received by passengers.

In recent years, chassis structures have been designed to enable the impact energy at the time of a side impact to be absorbed by the door as a whole. In such a chassis structure, the door guard bar has been used as an energy transmitting member for transmitting the impact energy to other members around the door guard bar to have the other members absorb the impact energy by their own deformation. Therefore, it is important that the member used as the door guard bar keep any impact force received to within its elastic deformation range and not deform. In particular, a member having the property of a high bending repulsion at the beginning of impact has been demanded. For this, increase of the strength of the member may be considered, but a higher strength results in the problems of brittle fracture or hydrogen induced cracking. Just increasing the strength of the member is not preferable for an automobile member. Therefore, the shape was focused on and studied for improvement of the bending repulsion at the beginning of impact.

Up to now, members for door guard bars have been studied using static bending test from the viewpoint of the absorption energy. For example, it is known that a high absorption energy can be obtained by increasing the strength of a steel tube while its cross-section is round (for example, see Japanese Unexamined Patent Publication (Kokai) No. H4-63242). However, in bending deformation behavior of a round-section steel tube, the load concentrates right under the load, and the sectional shape easily flattens due to local buckling. The member is similarly weak in impact bending. Therefore, a high bending repulsion at the start of impact cannot be obtained.

Further, an automobile structural member having a closed sectional structure, a maximum dimension in the longitudinal direction, a maximum dimension in the direction perpendicular to that, an outer circumferential length, and a thickness defined in relationship by a tensile strength of at least 1400 MPa has been proposed (for example, see Japanese Unexamined Patent Publication (Kokai) No. 2002-248941). With this member, it is true that the absorption energy and bending repulsion are improved compared with the past, but in each case the results were based on a static bending test. Whether a high bending repulsion at the beginning of impact is obtained even for an impact bending test is unclear.

On the other hand, as opposed to this, rectangular tubes superior in bending properties compared with round tubes are being developed. That is, there has been proposed a rectangular tube wherein the outsides of the corner parts are either not provided with an R or are providing with an R of a magnitude less than the thickness and the inner surfaces are provided with an R larger than the outside so as to make a load act directly on the two side surfaces parallel to the bending input direction and improve the bending repulsion (for example, see Japanese Unexamined Patent Publication (Kokai) No. H6-278458). The tensile strength of the member is the 1470 MPa class. With a member having this tensile strength, the possibility arises of brittle fracture or hydrogen induced cracking occurring due to the bending load applied. Further, when further working an electric resistance welded steel tube or other round tube into a rectangular tube, provision of a larger R at the inner surfaces of the corner parts than the outer surfaces is difficult in production, while when producing the above sectional shape, there is the problem that the cost ends up becoming remarkably higher.

SUMMARY OF THE INVENTION

As explained above, members for door guard bars have been studied up to now by static bending test from the viewpoint of improvement of the absorption energy in the range of plastic deformation. In impact bending, however, it is unclear if a high bending repulsion is obtained at the beginning of impact. Further, since the members are high in strength, there is a possibility of brittle fracture and hydrogen induced cracking occurring. Further, when working an electric resistance welded steel tube or other round tube into a rectangular tube, provision of a larger R at the inside surface than the outside surface is difficult in production, while when producing the above sectional shape, there is the problem that the cost ends up becoming remarkably higher.

An object of the present invention is therefore to provide an automobile strength member having a cross-sectional shape having a high bending repulsion at the beginning of impact and enabling a reduction in the production cost and lightening of the weight.

As explained above, a door guard bar member has to keep the impact force within the range of its elastic deformation and not deform at the time of side impact. In particular, it is required to exhibit a high bending repulsion at the beginning of impact.

The inventors engaged in studies and as a result discovered by when applying an impact bending load from a direction vertical to the longitudinal direction of a member as shown in FIG. 1, there is a high peak of bending repulsion at the start of impact at a rectangular tube compared with the bending repulsion at the start of impact of a round tube and that to improve the bending repulsion at the start of impact, it is important to keep buckling of the corner parts of a rectangular tube extremely small and to make the load be applied to the ends of the two side surfaces parallel to the bending input direction.

To keep the buckling of the corner parts of a rectangular tube extremely small, it is effective to reduce the R of the outside corner parts and make the thickness greater. Further, to cause the load to be applied directly to the ends of the two side surfaces parallel to the bending input direction, it is effective to greatly reduce the R of the outside corner parts from the thickness of the sides. In this case, the thickness of the sides other than the corner parts is constant. Further, even if making the thickness of the two side surfaces where the load is directly applied greater, the inventors discovered that the two side surfaces are reinforced and the bending repulsion at the beginning of impact becomes higher. Further, it is effective to increase the strength of the member. If the tensile strength of the member is too high, brittle fracture or hydrogen induced cracking become a concern.

On the other hand, from the viewpoint of production cost, by making the R of the outside corner parts larger than the R of the inside corner parts, production becomes easier and the production costs can be reduced.

To attain the above object, according to a first aspect of the invention, there is provided an automobile strength member comprised of a rectangular steel tube with a square cross-section, simultaneously satisfying the following relations (1) to (3), and having a strength of at least 690 MPa in terms of tensile strength:

$$R_1 \leq 1.5t \tag{1}$$

$$t_R \geq 1.1t \tag{2}$$

$$R_1 \geq R_2 \tag{3}$$

where, t: thickness of side (mm)
$t_R$: thickness of corner (mm)
$R_1$: outside corner R (mm)
$R_2$: inside corner R (mm)

According to a second aspect of the invention, there is provided an automobile structural member wherein both a maximum value and minimum value of hardness at a cross-section of the rectangular steel tube are in the range of within ±30% of the average value of the entire cross-section.

According to a third aspect of the invention, there is provided an automobile strength member comprised of a rectangular tube having a square cross-section simultaneously satisfying the relations (4) and (5):

$$0.50 \leq t_1/t_2 \leq 0.95 \tag{4}$$

$$R_1 \leq 1.5t_2 \tag{5}$$

where, $t_1$: thickness of pair of facing sides (mm)
$t_2$: thickness of other pair of facing sides (mm)
$R_1$: outside corner R (mm)

According to a fourth aspect of the invention, there is provided an automobile structural member comprised of a rectangular tube having a square cross-section for an automobile strength member as set forth in a third aspect of the invention arranged so that the thickness $t_2$ sides match the bending input direction.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
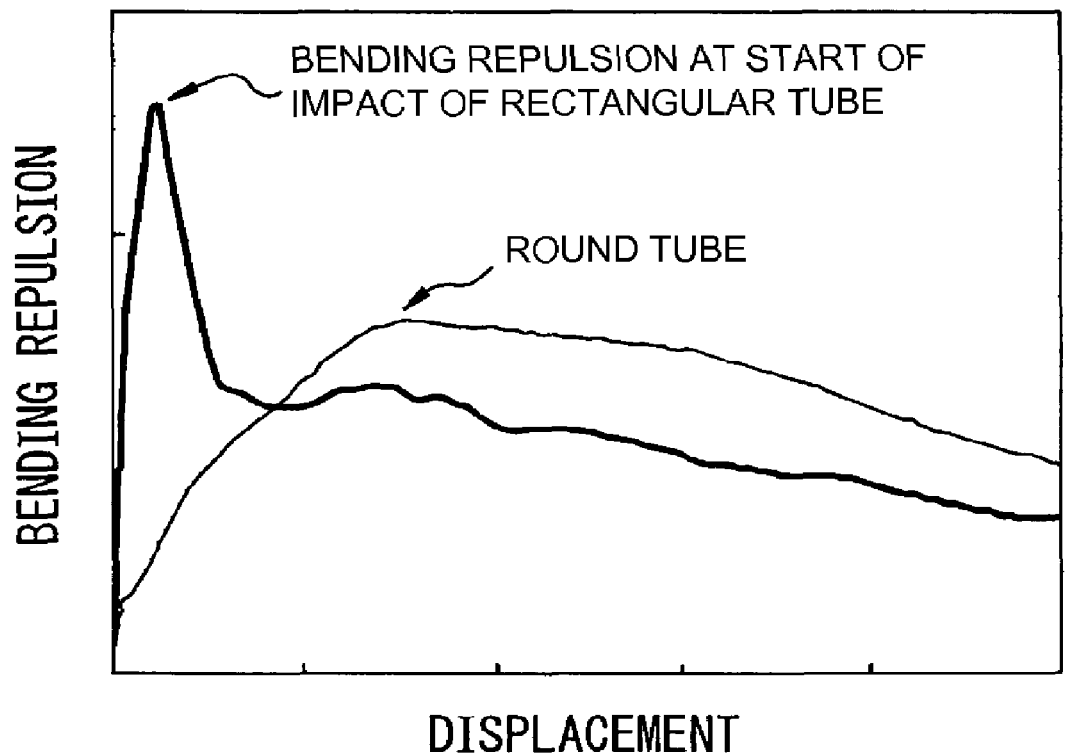
FIG. 1 is a view comparing displacement-bending repulsion curves of rectangular tubes and round tubes in impact bending.

Below, the present invention will be explained in more detail. First, the first aspect of the invention will be explained.

To improve the bending repulsion at the beginning of impact, by making the buckling of the corner parts extremely small and making the impact directly act on the ends of the two side surfaces parallel to the bending input direction, it is necessary to make flattening of the cross-section more difficult.

If the R of the outside corners (R1) is too large, no load directly acts on the ends of the two side surfaces parallel to the bending input direction, the two side surfaces parallel to the bending input direction bulge outward due to only the center side at the input side vertical to the bending input direction being pressed, and flattening of the cross-section easily occurs. As a result, the bending repulsion at the beginning of impact falls. In particular, if the R (R1) of the outside corners exceeds 1.5 times the thickness (t), the bending repulsion at the beginning of impact remarkably falls. Therefore, the outside corner R1 is made not more than 1.5 times the thickness as in relation (1):

$$R_1 \leq 1.5t \tag{1}$$

Further, to greatly reduce the buckling of the corner parts, it is also effective to make the thickness ($t_R$) of the corners greater.

By making the thickness ($t_R$) of the corners greater, the buckling resistance of the corners becomes larger and a load can be directly applied from the ends of the two side surfaces parallel to the bending input direction. If the corner thickness ($t_R$) is less than 1.1 times the side thicknesses, it is not effective. Therefore, the corner thickness ($t_R$) has to be made at least 1.1 times the side thicknesses as shown in relation (2). Further, here, the corner thickness ($t_R$) means the thickness of the thickest part of the corners.

$$t_R \geq 1.1t \tag{2}$$

On the other hand, making the outside corner R ($R_1$) larger than the inside corner R ($R_2$) facilitates production and reduces the production costs. That is, the following relation (3) has to be satisfied:

$$R_1 \geq R_2 \tag{3}$$

When the tensile strength of the member is less than 690 MPa, a high bending strength at the beginning of impact is not obtained, so the tensile strength of the member is made at least 690 MPa. Note that if the tensile strength of the member is too high, brittle fracture and hydrogen induced cracking of the member become a concern, so the tensile strength of the member is preferably less than 1470 MPa.

The rectangular steel tube with a high bending repulsion at the beginning of impact and with a reduced production cost simultaneously satisfies the conditions of the above relations (1), (2), and (3) and the tensile strength has to be at least 690 MPa. If even one of these conditions is not satisfied, the high bending repulsion at the beginning of impact and the reduced production cost cannot both be achieved.

Next, the second aspect of the invention will be explained.

The second aspect of the invention defines the maximum value and minimum value of the cross-sectional hardness of the rectangular steel tube as being in the range of ±30% of the average value of the cross-section as a whole. If this range is exceeded, the ductility becomes remarkably lower at the position of the maximum value of the cross-sectional hardness. Brittle fracture becomes easier at this position.

Next, the third aspect of the invention will be explained.

For improving the bending repulsion at the beginning of impact, making the thickness of the sides different is also effective. That is, here, the thickness of one pair of facing sides is made ($t_1$), the thickness of the other pair of facing sides parallel to the bending input direction is made ($t_2$), and $t_1$ is made smaller than $t_2$. When making the thickness of the sides parallel to the bending input direction a thicker $t_2$, the two side surfaces parallel to the bending input direction are strengthened and the bending repulsion at the beginning of impact becomes higher. However, if $t_1$ is made too small, the $t_1$ sides themselves may buckle, so the ratio of $t_1/t_2$ must be made at least 0.50. On the other hand, if the ratio of $t_1/t_2$ exceeds 0.95, the amount of rise of the bending repulsion at the beginning of impact becomes smaller. This is not preferable from the viewpoint of the improvement of the bending repulsion at the beginning of impact. Therefore, $t_1/t_2$ has to satisfy the conditions of the following relation (4):

$$0.50 \leq t_1/t_2 \leq 0.95 \quad (4)$$

Further, in this case, as explained in relation (1), the outside corner R ($R_1$) should be not more than 1.5 times the thickness ($t_2$) of the thicker sides. Therefore, it is necessary that the relation (5) be satisfied:

$$R_1 \leq 1.5 t_2 \quad (5)$$

The methods of production of a round tube serving as an automobile strength member of the present invention include drawing, rolling, extrusion, etc.

Further, the material for forming the automobile strength member is generally a steel material, but in the third aspect of the invention, if the conditions are satisfied, it is also possible to use light metal materials of aluminum, titanium, magnesium, or alloys of the same or other light weight materials. Next, the fourth aspect of the invention will be explained.

When installing the automobile strength member according to the third aspect of the invention in an automobile, it is necessary to orient it so as to enable the bending properties to be exhibited to the maximum extent. That is, when installing it so that the sides of the thickness $t_2$ thicker than one pair of facing sides become parallel to the bending input direction, the most effective automobile strength member can be obtained.

EXAMPLE 1

In the automobile strength member of the present invention, the bending repulsion at the beginning of impact is particularly important, so the bending repulsion at the start of impact was investigated by an impact bending test. The test conditions were a longitudinal direction length L of the test piece of 900 mm, a drop speed of 4.43 m/sec by a drop weight tester, a drop weight mass of 50 kg, and a bending span length L of 700 mm. The supports at the two ends were fixed.

Figure 2:
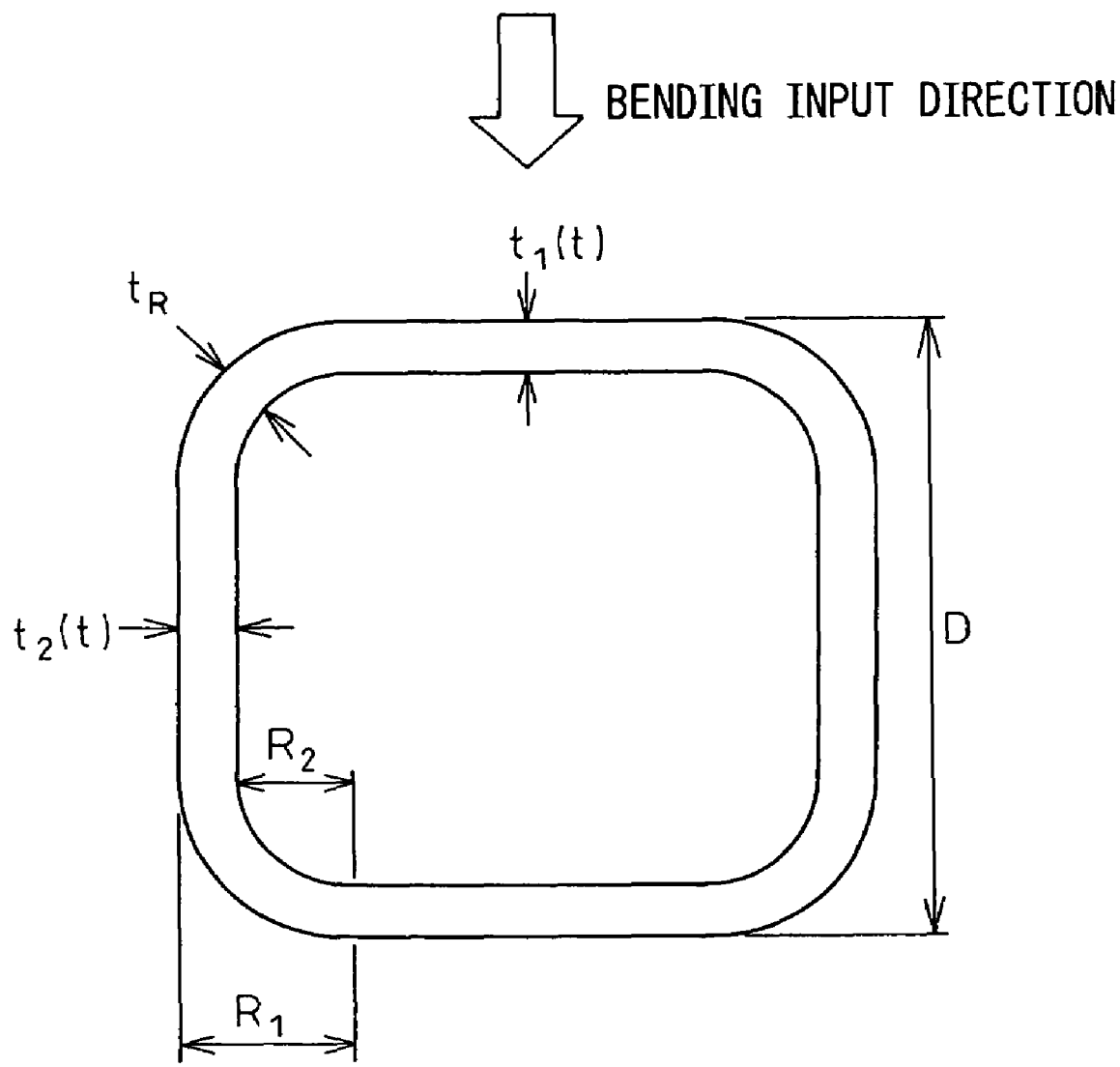
FIG. 2 is a view explaining the sectional shape of a rectangular tube.

FIG. 2 shows the cross-sectional shape of a rectangular tube. Here, D is the length dimension of one side (outside diameter) of the square cross-section.

Table 1 shows various types of automobile strength members. A conventional door guard bar uses a 1470 Mpa class round steel tube ($\phi$35.0×t2.3 mm), so the rates of rise of the bending repulsion at the beginning of impact and the weight ratio with respect to a round steel tube (symbol H) are compared. Here, the hardness of the cross-section is measured to find the difference between the maximum value and minimum value of the cross-sectional hardnesses and the average value of the cross-sectional hardness. The hardness was measured at 1 mm pitches so as to satisfy the JIS standards (JIS Z 2244) by the Vicker's hardness test method. Materials A and B of the examples of the present invention have higher bending repulsions at the beginning of impact regardless of being light in weight. Material C of an example of the present invention does not have that high a bending repulsion at the beginning of impact compared with Material H, but the amount of reduction of the weight is large. There is a high effect of reduction of weight of the automobile member. As opposed to this, Comparative Materials D, E, F, and G have a lower bending repulsion at the start of impact and reduction of weight compared with Prior Material H. That is, D has an $R_1$ of over 1.5t, E has a $t_R$ of less than 1.1t, and F has a small tensile strength—all outside of the scope of the present invention. The difference between the maximum value and minimum value of the cross-sectional hardness of Material G and the average of cross-sectional hardness is 33.8%. This ends up far higher than the less than 30% in the present invention. At the portion of a large cross-sectional hardness, the ductility remarkably falls and brittle fracture becomes easier. When producing a rectangular tube from an electric resistance welded steel tube or other round steel tube by the continuous rolling method, the welds remain as welded, so the 30% of the present invention is exceeded. On the other hand, a member produced from Material C by drawing is obtained by producing a round steel tube, then heat treating it to make the quality of the welds and base metal equal, so the difference between the maximum value and the minimum value of the cross-sectional hardness and the average of the cross-sectional hardness becomes 10.5% or within 30% in the present invention.

Table 2 shows automobile strength members with different side thicknesses. The bending input direction of the automobile strength members in an impact bending test shown in Table 2 was parallel to the thickness $t_2$ sides. Here, the rates of rise of the bending repulsion at the beginning of the impact and weight ratios for rectangular tubes with uniform side thicknesses (no. 7) were compared. Materials 1, 2, and 3 of the examples of the present invention had higher bending repulsions at the beginning of impact compared with Comparative Material 7 and had weights substantially the same as Material 7. As opposed to this, Comparative Materials 4 and 5 had slight increases in weight, but the bending repulsions at the beginning of the impact were not that high compared with Material 7. Comparative Material 6 exhibited an extremely high bending repulsion at the beginning of impact, but had a large thickness $t_2$ and became too heavy a weight and therefore was not preferable.

TABLE 1

| | Cross-sectional shape of member | | | | | | Difference of max. value and min. value of cross-sectional thickness and average of cross-sectional thickness (%) | | Rate of rise of bending repulsion at start of impact (%) | | |
|---|---|---|---|---|---|---|---|---|---|---|---|
| Symbol | Outside corner $R_1$ (mm) | Inside corner $R_2$ (mm) | Corner thickness $t_R$ (mm) | Side thickness t (mm) | Dimension D (mm) | Tensile strength (MPa) | | Process of production | | Weight ratio (%) | Class |
| A | 3.0 | 0.5 | 3.4 | 3.0 | 23 | 850 | 11.0 | Drawing | 31.9 | −1.6 | Inv. |
| B | 2.5 | 0.3 | 2.2 | 2.0 | 30 | 850 | 10.0 | Drawing | 15.4 | −7.4 | Inv. |
| C | 3.0 | 0.5 | 3.4 | 3.0 | 17 | 850 | 10.5 | Rolling | 5.6 | −32.1 | Inv. |
| D | 3.5 | 1.0 | 2.5 | 2.0 | 30 | 850 | 10.0 | Drawing | 1.6 | −9.2 | Comp. |
| E | 2.5 | 0.5 | 2.0 | 2.0 | 30 | 850 | 10.5 | Drawing | 4.4 | −7.3 | Comp. |
| F | 3.0 | 0.5 | 3.4 | 3.0 | 23 | 590 | 9.5 | Drawing | 4.4 | −1.6 | Comp. |

TABLE 1-continued

| | Cross-sectional shape of member | | | | | Difference of max. value and min. value of cross-sectional thickness and average of cross-sectional thickness (%) | Process of production | Rate of rise of bending repulsion at start of impact (%) | Weight ratio (%) | Class |
|---|---|---|---|---|---|---|---|---|---|---|
| Symbol | Outside corner $R_1$ (mm) | Inside corner $R_2$ (mm) | Corner thickness $t_R$ (mm) | Side thickness t (mm) | Dimension D (mm) | Tensile strength (MPa) | | | | |
| G | 3.0 | 1.0 | 2.0 | 2.0 | 30 | 850 | 33.8 | Rolling | 1.1 | +8.1 | Comp. |
| H | Round tube/φ35.0 × t 2.3 mm) | | | | | 1470 | 10.0 | Rolling + quenching | 0 | 0 | Prior art |

TABLE 2

| | Cross-sectional shape of member | | | | | | Rate of rise | | |
|---|---|---|---|---|---|---|---|---|---|
| No. | Side thickness $t_1$ (mm) | Side thickness $t_2$ (mm) | $t_1/t_2$ | Outside corner $R_1$ (mm) | Dimension D (mm) | Process of production | in bending repulsion at beginning of impact (%) | Weight ratio (%) | Class |
| 1 | 1.80 | 2.20 | 0.82 | 3.0 | 30 | Drawing | 8.5 | 0 | Inv. |
| 2 | 2.00 | 2.40 | 0.83 | 3.0 | 30 | Drawing | 13.0 | 9.6 | Inv. |
| 3 | 2.00 | 2.20 | 0.91 | 3.0 | 30 | Drawing | 10.0 | 4.8 | Inv. |
| 4 | 2.00 | 2.05 | 0.98 | 3.0 | 30 | Drawing | 1.5 | 1.2 | Comp. |
| 5 | 2.00 | 3.00 | 0.67 | 5.0 | 30 | Drawing | 4.5 | 20.2 | Comp. |
| 6 | 2.00 | 4.50 | 0.44 | 3.0 | 30 | Drawing | 35.0 | 60.1 | Comp. |
| 7 | 2.00 | 2.00 | 1.00 | 3.0 | 30 | Rolling | 0 | 0 | Comp. |

According to the present invention, it is possible to provide an automobile strength member having a cross-sectional shape giving a high bending repulsion at the beginning of impact and able to reduce the production cost and lighten the weight and achieve a greater improvement in safety and a reduction of cost of an automobile.

While the invention has been described with reference to specific embodiments chosen for purpose of illustration, it should be apparent that numerous modifications could be made thereto by those skilled in the art without departing from the basic concept and scope of the invention.

What is claimed is:

1. An automobile door guard bar comprising a tube having a square cross-section perpendicular to the length of said tube; wherein said tube is made of a rigid material;
   said tube having two first parallel sides perpendicular to a bending input direction, said two first parallel sides perpendicular to the bending input direction each having a thickness t parallel to the bending input direction;
   said tube having two second parallel sides parallel to the bending input direction, said two second parallel sides parallel to the bending input direction each having said thickness t perpendicular to the bending input direction;
   said tube having four corners with each corner having a convex outside surface defined by radius $R_1$ and with each corner having a concave inside surface defined by radius $R_2$;
   each corner having a radial thickness $t_r$; and
   said tube simultaneously satisfying the following relations (1) to (3):

$R_1 \leq 1.5 t$     (1)

$t_R \geq 1.1 t$     (2)

$R_1 \geq R_2$     (3).

2. An automobile comprising the automobile door guard bar of claim 1, wherein said automobile door guard bar is oriented such that said two first parallel sides are perpendicular to a bending input direction.

3. An automobile door guard bar as set forth in claim 1, which is made from a material selected from the group consisting of steel, aluminum, titanium, magnesium and an alloy thereof.

4. An automobile door guard bar as set forth in claim 3, which is made from steel having a strength of at least 690 MPa in terms of tensile strength.

5. An automobile door guard bar as set forth in claim 4, wherein both a maximum value and a minimum value of hardness at a cross-section of said tube are in a range of within ±30% of the average value of the entire cross-section of said tube.

6. An automobile door guard bar comprising a tube having a square cross-section perpendicular to the length of said tube; wherein said tube is made of a rigid material;
   said tube having two first parallel sides perpendicular to a bending input direction, said two first parallel sides perpendicular to the bending input direction each having a thickness $t_1$ parallel to the bending input direction;
   said tube having two second parallel sides parallel to the bending input direction, said two second parallel sides parallel to the bending input direction each having a thickness $t_2$ perpendicular to the bending input direction;
   said tube having four corners with each corner having a convex outside surface defined by radius $R_1$; and said tube simultaneously satisfying the following relations (4) and (5):

$$0.50 \leq t_1/t_2 \leq 0.95 \quad (4)$$

$$R_1 \leq 1.5 t_2 \quad (5).$$

7. An automobile comprising the automobile door guard bar of claim 6, wherein said automobile door guard bar is oriented such that said two first parallel sides are perpendicular to a bending input direction.

8. An automobile door guard bar as set forth in claim 6, which is made from a material selected from the group consisting of steel, aluminum, titanium, magnesium and an alloy thereof.

9. An automobile door guard bar as set forth in claim 8, which is made from steel having a strength of at least 690 MPa in terms of tensile strength.

* * * * *

UNITED STATES PATENT AND TRADEMARK OFFICE
CERTIFICATE OF CORRECTION

| | |
|---|---|
| PATENT NO. | : 7,648,191 B2 |
| APPLICATION NO. | : 10/956918 |
| DATED | : January 19, 2010 |
| INVENTOR(S) | : Sakamoto et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Sixteenth Day of November, 2010

David J. Kappos
*Director of the United States Patent and Trademark Office*